United States Patent [19]
Sweet et al.

[11] 3,833,237
[45] Sept. 3, 1974

[54] FRONT AXLE ASSEMBLY FOR A FULL TRAILER

[75] Inventors: Phillip J. Sweet; Buck C. Hamlet; David L. Sweet, all of Fresno, Calif.

[73] Assignee: American Carrier Equipment, Fresno, Calif.

[22] Filed: Oct. 24, 1972

[21] Appl. No.: 299,715

[52] U.S. Cl............................. 280/125, 280/124 F
[51] Int. Cl............................................. B62d 53/00
[58] Field of Search ........... 280/113, 114, 115, 116, 280/125, 130, 132, 124 F

[56] References Cited
UNITED STATES PATENTS
3,185,496  5/1965  Harbers .............................. 280/125
3,617,072  11/1971  Turner............................. 280/124 F

*Primary Examiner*—Philip Goodman
*Attorney, Agent, or Firm*—Huebner & Worrel

[57] ABSTRACT

An improved front axle assembly for a full trailer characterized by a pair of laterally spaced single convolute air springs disposed in vertical alignment between a wheel-supported axle and a turntable adapted to support one end of a trailer, and a pair of cantilevered leaf springs extended between the axle and a forwardly disposed hanger integrally related with said assembly.

5 Claims, 5 Drawing Figures

PATENTED SEP 3 1974　　3,833,237

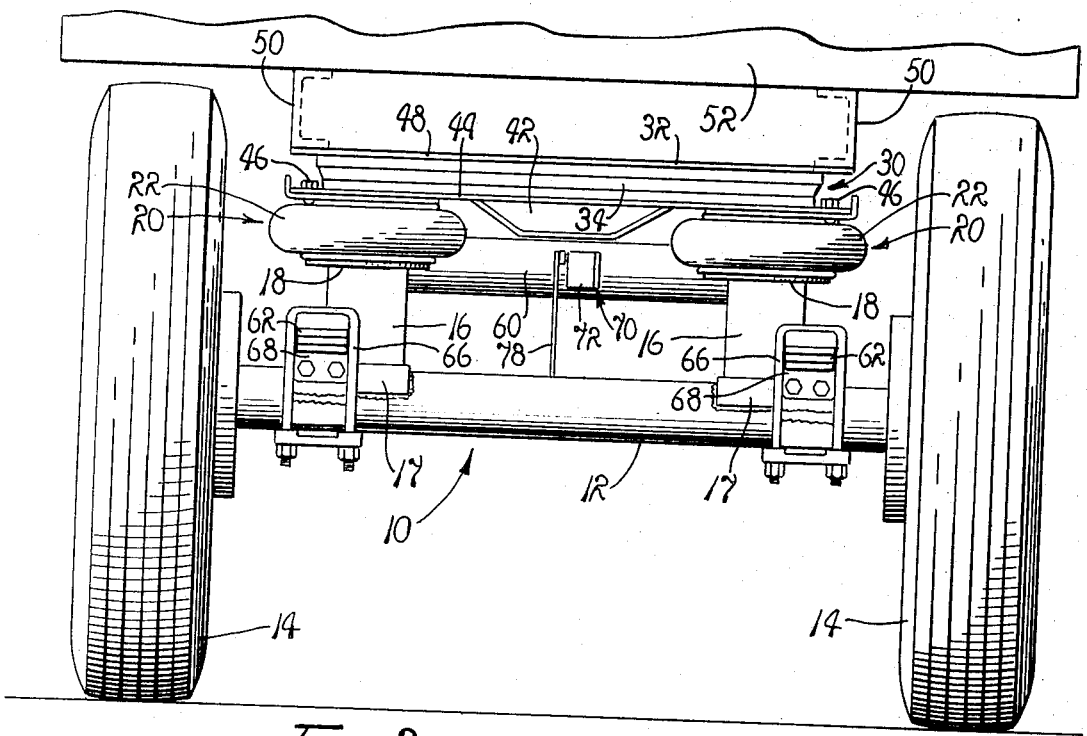
Fig. 3.
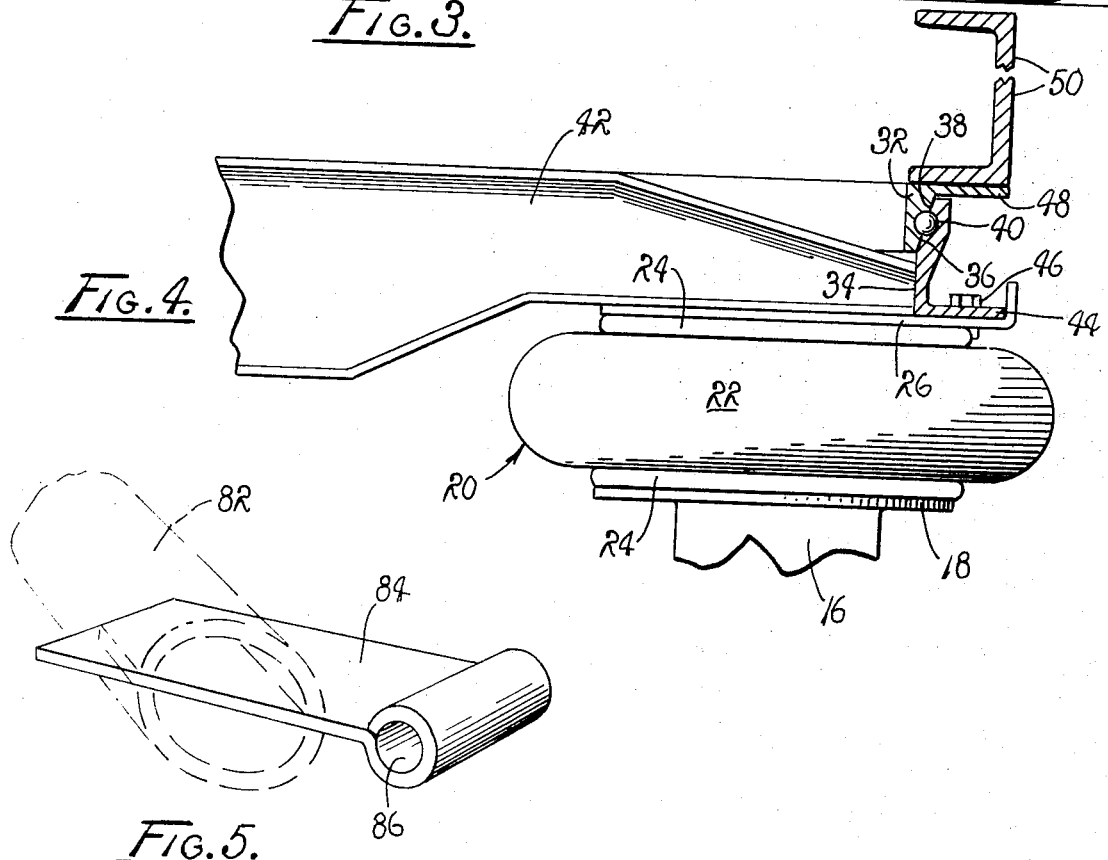
Fig. 4.
Fig. 5.

3,833,237

FRONT AXLE ASSEMBLY FOR A FULL TRAILER

BACKGROUND OF THE INVENTION

The invention relates to suspension systems and more particularly an improved front axle assembly for a full trailer.

In the trade, and as hereinafter employed, the term front axle assembly for a full trailer is intended to mean a wheel-supported assembly particularly adapted to be employed in supporting the front or leading end of a trailer. Such units, of course, frequently include a wheel-supported axle, a fifth wheel, and a tongue, as is well known to those familiar with the trucking industry.

Heretofore, it has been common practice to provide front axle assemblies for full trailers with suspension systems which include coil springs and/or leaf springs for supporting fifth wheels and loads operatively applied thereto. Such units serve to transfer loads from load-supporting frames to wheel-supported axles, as well as for absorbing applied shock loads as the vehicles traverse rough and/or uneven surfaces.

Coil springs, leaf springs, and the like generally are known to be inefficient. This results from the fact that when such springs are of an adequate strength they tend to add to the overall weight of the associated vehicle and, of course, added weight necessarily tends to decrease total efficiency.

Thus, the overall load-transporting capabilities of vehicles equipped with load-supporting structures of types heretofore commonly employed are seriously impaired. Therefore, it generally is accepted that an increased efficiency can readily be achieved simply by improving suspension systems.

As more fully described in copending application Ser. No. 263,965, filed June 19, 1972, it has been discovered that a reduction in the overall weight of suspension systems can be achieved through a use of a pair of air springs interposed in vertical alignment between a load-supporting frame and an axle affixed thereto. Of course, front axle assemblies for full trailers must possess steering capabilities. This, in turn, requires that the assembly be quite compact, while yet being capable of maintaining a high degree of stability, even at highway speeds.

It is therefore the purpose of the instant invention to provide a compact, practical and economic front axle assembly for a full trailer through which the weight-reduction characteristics of air springs are more fully appreciated.

OBJECTS AND SUMMARY OF THE INVENTION

It is therefore an object of the instant invention to provide an improved front axle assembly for a full trailer.

It is another object to provide a compact, stable and lightweight front axle assembly for a full trailer.

It is another object to provide an improved front axle assembly for a full trailer, through which the advantages of an air spring suspension system is realized.

It is another object to provide a practical, compact, economical and reliable front axle assembly for a full trailer through which the advantages of an air spring suspension assembly equipped with single convolute air springs is realized.

These and other objects and advantages are achieved by mounting a pair of air springs in vertical alignment with a wheel-supported axle and coupling a turntable in a supported, superimposed relationship with the air bags, whereby the air bags are arranged in a shock-absorbing disposition between the turntable and the wheel-supported axle.

BRIEF DESCRIPTION OF THE DRAWINGS

FIG. 3 is an end view of the assembly shown in FIG. 1.

FIG. 4 is a fragmented view, on somewhat of an enlarged scale, of an air bag and structure supported thereby, as included within the assembly shown in FIGS. 1 through 3.

FIG. 5 is a fragmented perspective view depicting a preferred manner in which a tongue is coupled with the assembly for towing a full trailer.

DESCRIPTION OF THE PREFERRED EMBODIMENT

Figure 1:
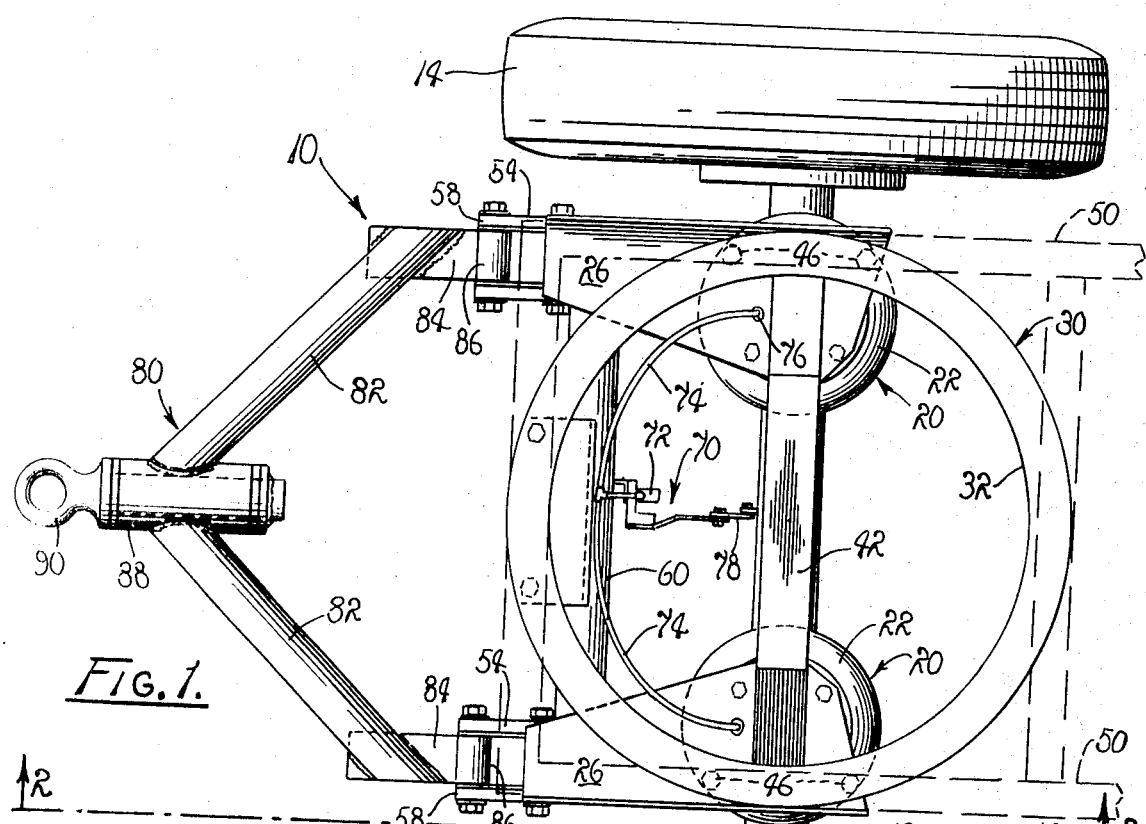
FIG. 1 is a top plan view of the improved front axle assembly which embodies the principles of the instant invention.
Figure 2:
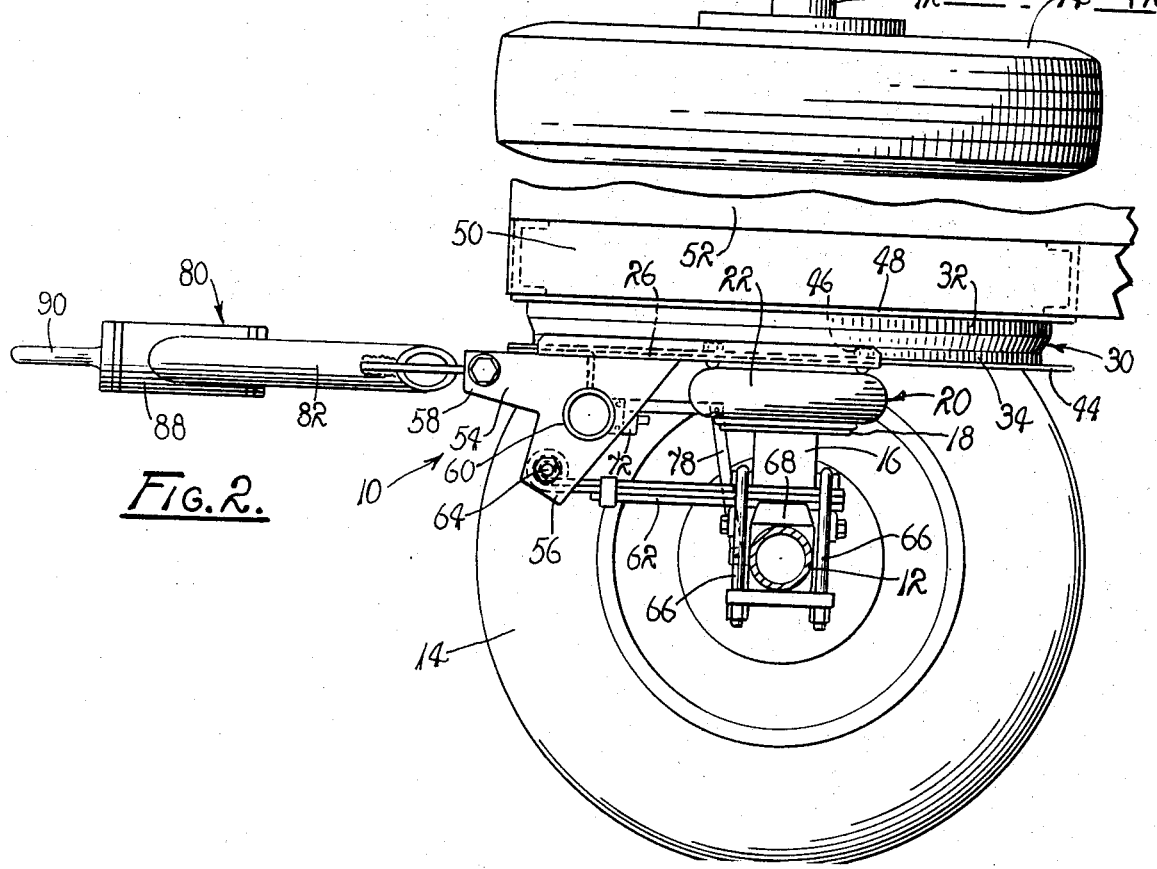
FIG. 2 is a partially sectioned elevation, taken generally along line 2—2 of FIG. 1.

Referring now to the drawings wherein like reference characters designate like or corresponding parts throughout the several views, there is shown in FIG. 1 an improved front axle assembly, generally designated 10, for a full trailer, not shown.

The assembly 10 embodies the principles of the instant invention, which includes an axle 12 which receives at its opposite ends a pair of supporting wheels 14. It should, of course, readily be apparent that the wheels 14 are of a known design and are mounted on the axle 12 in a convenient manner consistent with the known principles of design for trucks, trailers and the like. The axle 12, in turn, serves as a support for a pair of upright pedestals 16, each of which includes a base 17 mounted on the axle and fixed thereto, as by welding and the like. Supported at the uppermost end of each of the pedestals 16 there is a receiver plate 18. Each of the receiver plates 18, in turn, serves to receive thereon an air spring, generally designated 20.

Each of the air springs 20 includes a flexible, single convolute air bag 22, of known design, formed of a suitable material, such as Neoprene and the like, sandwiched between a pair of planar support plates 24. These plates accommodate a coupling of the air bags 22 with the receiver plate 18 as well as a base plate 26 upon which is mounted a turntable generally designated 30.

The turntable 30 includes a pair of concentric rings 32 and 34 mated at juxtaposed surfaces 36 and 38. These surfaces are of a downwardly converging, frusto-conical configuration and include adjacent annular grooves, not designated, within which there is seated a plurality of load-supporting ball-bearings, designated 40. It is to be understood, therefore, that the ring 34 is supported for rotation relative to the ring 32, by the bearings 40.

Extended between the base plates 26 and fixed thereto in a diametric relationship with the ring 34, there is provided a load-supporting beam 42. This beam is fixed at its opposite ends to the plates 26 and the ring 34, as by welding or other suitable techniques.

In practice, the ring 34 is provided with an annular lip 44 to which is fastened the base plates 26. Any suitable technique is employed for this purpose, including a use of nut-and-bolt assemblies 46. It should readily be apparent that the turntable 30, including the support beam 42 is securely coupled with the air bags 22 to provide a compact, rigid and highly stable front axle assembly for a full trailer which can readily be coupled with a towing vehicle for use at highway speeds.

As a practical matter, the ring 32 also includes an annular lip 48. This lip is joined with a plurality of longitudinally extended beams 50 employed to impart vertical support to a trailer bed 52, FIG. 3. Of course, the beam 50 is coupled with the lip 48 of the ring 32 in any suitable manner, including a use of welds, bolts and the like, which accommodate a secure coupling of the assembly 10 in a load-supporting relationship with the trailer bed 52.

Also coupled in a suspended relationship with each of the base plates 26, there is a hanger bracket 54. Each of these brackets is of a bifurcated configuration and is disposed forwardly of the axle 12. As a practical matter, each bracket 54 includes a depending leg 56 and a forwardly projected leg 58. These brackets, in turn, are united through a transverse, rigid coupling member 60 welded thereto. Thus, the brackets 54 and the coupling member 60 impart substantial rigidity to the assembly 10.

As should be fully appreciated by those familiar with the design of rolling stock, it is desirable to provide each of the assemblies 10 with a suitable braking mechanism which, in effect, serves to couple the wheels 14 with the axle 12. This is achieved by establishing a substantially fixed relationship between the wheels 14 and the axle 12 in order to arrest rotation of the wheels. As a consequence, a torque normally is applied to the axle 12 as braking of the wheels is achieved. In order to dissipate the applied torque, a pair of cantilevered leaf springs 62, each having its base end securely fixed to the axle 12, is extended forwardly for coupling with the depending legs 56 of the hanger brackets 54. A pair of suitable coupling pins 64 is employed in pinning the leaf springs 62 with the brackets 54, in any suitable manner.

In practice, the base end of each of the leaf springs 62 is united with the axle 12 through a pair of U-bolts 66 and pillow pads 68 seated on the axle 12 and positioned to receive the base end portions of the leaf springs, in a manner more fully described in the aforementioned copending application. It is to be understood, however, that the cantilevered leaf springs 62 serve to dissipate torque imparted to the axle 12 as a braking of the wheels 14 is effected. This dissipation occurs as the individual leafs of the leaf spring 62 are flexed, in a well understood manner. The extent to which the leaf springs 62 are flexed is dictated by the angular displacement of the axle 12, which normally is slight.

It is important to note that the inherent flexibility of the air bags 22 of the air springs 20 accommodates limited displacement of the pedestals 16 so that limited angular displacement of the axle 12 is facilitated. Therefore, the air bags 22 substantially eliminate a need for an incorporation of motion accommodating linkage so often employed for accommodating rotation of axles with respect to fifth wheels and the like. As a consequence, a further conservation of weight is realized through a use of the air spring suspension system of the instant invention.

The air spring 20 are provided with a pneumatic system 70 employable for controlling pressurization of the air bags 22. In practice, the pneumatic system 70 is provided with a flow control valve 72, mounted on the coupling member 60, connected with a suitable source of air, not shown, operatively maintained at adequate pressures. Such systems are often found aboard trucks and the like and are employed in braking systems and the like. The valve 72 is further connected with the air bags 22 through flexible pressure lines 74 and suitable fittings 76 connected therewith. As is also more fully disclosed in the aforementioned copending application, the valve 72 is positionable in any one of three positions which includes a First Position wherein the air bags 22 are caused to communicate with the source of air under pressure, for charging the air bags, a Second Position wherein the air bags 22 are placed in direct communication with ambient atmosphere, for exhausting the air bags 22, and a Third Position wherein the pressure of the air within the air bags 22 is stabilized.

The instantaneous position assumed by the valve 72 is dictated by the position assumed by an articulated actuator linkage 78 extended from the axle 12 to the valve. In operation, the valve 72 is activated for simultaneously charging the air bags as the air bags are compressed under shock loads, while a simultaneous evacuation of the air bags occurs as compressive loads are removed therefrom. Accordingly, it should readily be apparent that the volume of air confined within the air bags 22 of the air spring 20 preferably remains substantially constant while the pressures established therewithin are varied in accordance with the instantaneous position of the axle 12, relative to the turntable 30 supported thereon.

In view of the fact that the assembly 10 is employed as a front axle assembly for a full trailer, suitable coupling means must be provided for securing the assembly 10 with a towing vehicle. Therefore, the assembly 10 is provided with a tongue, generally designated 80. The tongue 80 is of a bifurcated configuration and includes a pair of diverging legs 82 united with the forwardly projected legs 58 of the bracket 54. Suitable means, preferably a pair of hinge plates 84 including berlin eyes 86 is provided for this purpose. Of course, the legs 82 and the hinge plate 84 are united in a suitable manner, as by welding or the like.

The legs 82 of the tongue 80 converge on a hitch 88 having a terminal clevis 90. Of course, the particular configuration of the hitch 88 is varied in a manner dictated by the intended use of the assembly 10.

OPERATION

It is believed that in view of the foregoing description, the operation of the device will be readily understood and it will be briefly reviewed at this point.

With the assembly 10 fabricated in the manner hereinbefore described, it is, in operation, coupled in a supporting relationship with a trailer bed 52, by the beams 50, and secured with a towing vehicle, not designated, at the hitch 88. Of course, as the towing vehicle, in operation, changes directions of travel, the ring 34 of the turntable 30 is rotated on the bearings 40 relative to the ring 32 affixed to the support 50. In the event an uneven surface is encountered by either of the wheels 14, for thus imparting a "bouncing" motion thereto, the air bags 22 serve to dissipate the resulting applied shock loads. As the axle 12 initially moves upwardly, towards the air bags 22, the air bags are collapsed, however, the linkage 78 responsively is rendered effective for repositioning the flow control valve 72 to the First Position wherein air under pressure is delivered from the source through the lines 74 and the fittings 76, in order to prevent the bags 22 from being collapsed under the applied compressive forces. Conversely, as the axle 12 is dropped or displaced downwardly away from the air bags 22, the linkage 78 is rendered effective for repositioning the flow control valve 72 to its Second Position wherein air is exhausted from the bags 22. Once the axle 12 assumes a stabilized position, relative to the air bags 22, the actuator linkage 78 repositions the flow control valve to its Third Position so that the pressure of the gas confined within the air bags 22 thus is stabilized.

Of course, as the wheels encounter uneven and resistive surfaces, as well as when braking of the wheels 14 is effected, a resulting motion is imparted to the axle 12. The applied force, however, is dissipated through the effects of cantilevered leaf springs 62. Should angular displacement be imparted to the axle 12, the walls of the air bags 22 are flexed in order to accommodate such displacement.

In view of the foregoing, it should readily be apparent that through use of the front axle assembly 10 of the instant invention, the total efficiency of a full trailer is greatly enhanced.

Although the invention has been herein shown and described in what is conceived to be the most practical and preferred embodiment, it is recognized that departures may be made therefrom within the scope of the invention, which is not to be limited to the illustrative details disclosed.

Having thus described our invention, what we claim as new and desire to secure by Letters Patent is:

1. In a front axle assembly for a full trailer, the improvement comprising:
   A. a wheel-supported axle;
   B. a turntable adapted to be coupled in a load-supporting relationship with a given trailer;
   C. means including a pair of flexible air bags interposed between said axle and said turntable for coupling the turntable with said axle, each of said air bags being adapted to confine therewithin a variably pressurized body of gas;
   D. means including a valve connected with each air bag of said pair of air bags, and a valve actuator connected with said valve for varying the pressure of the bodies of gas confined within the air bags in response to vertical motion imparted to said axle relative to said turntable; and
   E. an elongated tongue secured to the axle and adapted to be coupled with a towing vehicle.

2. The improvement of claim 1 wherein said turntable includes a pair of concentrically related rings having a plurality of bearings interposed therebetween.

3. A front axle assembly for a full trailer comprising:

A. a wheel-supported axle;
   B. a turntable including a pair of juxtaposed concentric rings and a plurality of bearings interposed therebetween;
   C. a plurality of single convolute air springs mounted on said axle, each of said air springs comprising a flexible member adapted to confine therewithin a pressurized body of gas;
   D. means including a pair of base plates for mounting said turntable on said air springs;
   E. a plurality of cantilevered leaf springs mounted on said axle and extended forwardly therefrom;
   F. a hanger assembly suspended from said pair of base plates;
   G. means coupling the distal end of each of said cantilevered leaf springs with said hanger assembly; and
   H. an elongated tongue assembly pivotally coupled to said hanger and adapted to be secured to a towing vehicle.

4. A front axle assembly for a full trailer comprising:

A. a wheel-supported axle;
   B. a turntable including a pair of concentrically related rings, a plurality of bearings interposed between the rings in load-supporting engagement therewith, and means connected with one of said rings adapted to receive a given trailer in a load-supporting relationship;
   C. means for coupling said turntable with said axle including a pair of expansible air bags, each air bag of said pair being supported by said axle and confining therewithin a variably pressurized body of gas, and means connected with the other ring of said pair for coupling said pair of air bags in load-supporting engagement with said pair of rings;
   D. means responsive to relative motion imparted to said axle and said turntable for variably pressurizing said air bags; and
   E. means for coupling the assembly with a towing vehicle.

5. The front axle assembly of claim 4 wherein said means for pressurizing the air bags includes an actuatable valve mounted on said turntable and coupled at one side thereof with an air circuit and coupled at its opposite side with said pair of air bags, and a valve actuator arm connected at its opposite ends with said valve and with said axle for actuating the valve in response to relative motion imparted to said axle and said turntable.

* * * * *